(12) United States Patent
Lai

(10) Patent No.: US 8,245,195 B2
(45) Date of Patent: Aug. 14, 2012

(54) SYSTEM AND METHOD FOR DEBUGGING A COMPUTER PROGRAM

(75) Inventor: Ching-Yu Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 919 days.

(21) Appl. No.: 12/329,607

(22) Filed: Dec. 7, 2008

(65) Prior Publication Data

US 2009/0172642 A1  Jul. 2, 2009

(30) Foreign Application Priority Data

Dec. 28, 2007 (CN) .......................... 2007 1 0203516

(51) Int. Cl.
*G06F 9/44* (2006.01)
*G06F 7/38* (2006.01)

(52) U.S. Cl. .................... 717/124; 712/224; 712/227

(58) Field of Classification Search .................. 717/124
See application file for complete search history.

(56) References Cited

U.S. PATENT DOCUMENTS

| | | | |
|---|---|---|---|
| 5,438,670 A * | 8/1995 | Baror et al. ................. 711/3 |
| 6,269,436 B1 * | 7/2001 | Tran et al. ................. 712/23 |
| 6,598,181 B1 * | 7/2003 | Pennell ................. 714/38.14 |
| 6,915,416 B2 * | 7/2005 | Deng et al. ................. 712/227 |
| 7,765,095 B1 * | 7/2010 | Nemecek ................. 703/26 |
| 2006/0026685 A1 * | 2/2006 | Saito ................. 726/23 |

* cited by examiner

*Primary Examiner* — Li Zhen
*Assistant Examiner* — Arshia S Kia
(74) *Attorney, Agent, or Firm* — Altis Law Group, Inc.

(57) ABSTRACT

A method for debugging a computer program is provided. The method pushes a plurality of registers into a stack, and calculates a jump-from address and a jump-to address for each jump according to values of the registers. The jump-from address and the jump-to address are then stored into a storage system. The method may monitor the execution of the computer program in system management mode (SMM).

17 Claims, 9 Drawing Sheets

| Instruction (Machine code) | Operation code (hex) | Mnemonic | Jump condition | Jump-to address | Jump-from address |
|---|---|---|---|---|---|
| J_cond Short (7x/ E3 rel8) | 70 | JO | OF=1 | INT_CS* 10h + (INT_IP + (rel8+2) & FFh) | INT_CS*10 h + INT_IP |
| | 71 | JNO | OF=0 | | |
| | 72 | JC, JB, JNAE | CF=1 | | |
| | 73 | JNC, JAE, JNB | CF=0 | | |
| | 74 | JZ, JE | ZF=1 | | |
| | 75 | JNZ, JNE | ZF=0 | | |
| | 76 | JNA, JBE | CF=1 or ZF=1 | | |
| | 77 | JA, JNBE | CF=0 and ZF=0 | | |
| | 78 | JS | SF=1 | | |
| | 79 | JNS | SF=0 | | |
| | 7A | JP | PF=1 | | |
| | 7B | JNP | PF=0 | | |
| | 7C | JL, JNGE | SF != OF | | |
| | 7D | JNL, JGE | SF = OF | | |
| | 7E | JNG, JLE | ZF=1 or (SF != OF) | | |
| | 7F | JG, JNLE | ZF=0 and (SF = OF) | | |
| | E3 | JCXZ | CX=0 | | |
| | E3 | JECXZ | ECX=0 | | |
| J_cond Near (0F 8x rel16) | 0F 80 | JO | OF=1 | INT_CS* 10h + (INT_IP + rel16+4) & FFFFh) | INT_CS*10 h + INT_IP |
| | 0F 81 | JNO | OF=0 | | |
| | 0F 82 | JC, JB, JNAE | CF=1 | | |
| | 0F 83 | JNC, JAE, JNB | CF=0 | | |
| | 0F 84 | JZ, JE | ZF=1 | | |
| | 0F 85 | JNZ, JNE | ZF=0 | | |
| | 0F 86 | JNA, JBE | CF=1 or ZF=1 | | |
| | 0F 87 | JA, JNBE | CF=0 and ZF=0 | | |
| | 0F 88 | JS | SF=1 | | |
| | 0F 89 | JNS | SF=0 | | |
| | 0F 8A | JP | PF=1 | | |
| | 0F 8B | JNP | PF=0 | | |
| | 0F 8C | JL, JNGE | SF != OF | | |
| | 0F 8D | JNL, JGE | SF = OF | | |
| | 0F 8E | JNG, JLE | ZF=1 or (SF != OF) | | |
| | 0F 8F | JG, JNLE | ZF=0 and (SF = OF) | | |

FIG. 8

| Instruction (Machine code) | Operation code (hex) | Mnemonic | Jump condition | Jump-to address | Jump-from address |
|---|---|---|---|---|---|
| JMP Short (EB rel8) | EB | Jmp short | Always jump | INT_CS*10h + (INT_IP + (rel8+2) &FFh) | INT_CS*10h + INT_IP |
| JMP Near (E9 rel16) | E9 | Jmp | Always jump | INT_CS*10h + (INT_IP + (rel16+3) &FFFFh) | INT_CS*10h + INT_IP |
| JMP Far (EA seg16 rel16) | EA | Jmp far ptr | Always jump | seg16*10h + (INT_IP + (rel16+5) & FFFFh) | INT_CS*10h + INT_IP |
| CALL Near (E8 rel16) | E8 | Call | Always jump | INT_CS*10h + (INT_IP + (rel16+3) & FFFFh) | INT_CS*10h + INT_IP |
| RET Near (C3) | C3 | Ret | Always jump | INT_CS *10h + CALL_IP | INT_CS*10h + INT_IP |
| CALL Far (9A seg16 rel16) | 9A | Call | Always jump | seg16*10h + (INT_IP + (rel16+5) & FFFFh) | INT_CS*10h + INT_IP |
| RET Far (CB) | CB | Ret | Always jump | CALL_Far_CS*10h + CALL_IP | INT_CS*10h + INT_IP |

FIG. 9

SYSTEM AND METHOD FOR DEBUGGING A COMPUTER PROGRAM

FIELD OF THE INVENTION

Embodiments of the present disclosure relate to computer programs, and more particularly to a system and method for debugging a computer program.

DESCRIPTION OF RELATED ART

Generally speaking, program debugging is performed to monitor the execution of a computer program, so that various software bugs within the computer program may be detected. An Intel central processing unit (CPU) provides a last branch trace model specific register (MSR) to debug computer programs. The method can be used in real mode, protected mode, and virtual 8086 mode. However, the method does not work in system management mode (SMM). SMM is an operating mode available in processors in the x86 architecture, in which all normal execution is suspended.

What is needed, therefore, is a system and method for debugging a computer program in SMM.

BRIEF DESCRIPTION OF THE DRAWINGS

FIG. 8 illustrates one embodiment of jump-to addresses, and jump-from addresses for short conditional jump instructions and near conditional jump instructions.

FIG. 9 illustrates one embodiment of jump-to addresses, and jump-from addresses for a short unconditional jump instruction, near unconditional jump instruction, far unconditional jump instruction, near call instruction, far call instruction, near return instruction, and far return instruction.

DETAILED DESCRIPTION OF CERTAIN INVENTIVE EMBODIMENTS

System Management Mode (SMM) is an operating mode available in processors in the x86 architecture, such as processors from Intel, Cyrix, Advanced Micro Devices (AMD), VIA, and many others. All normal execution (including the operating system) is suspended in SMM.

Figure 1:
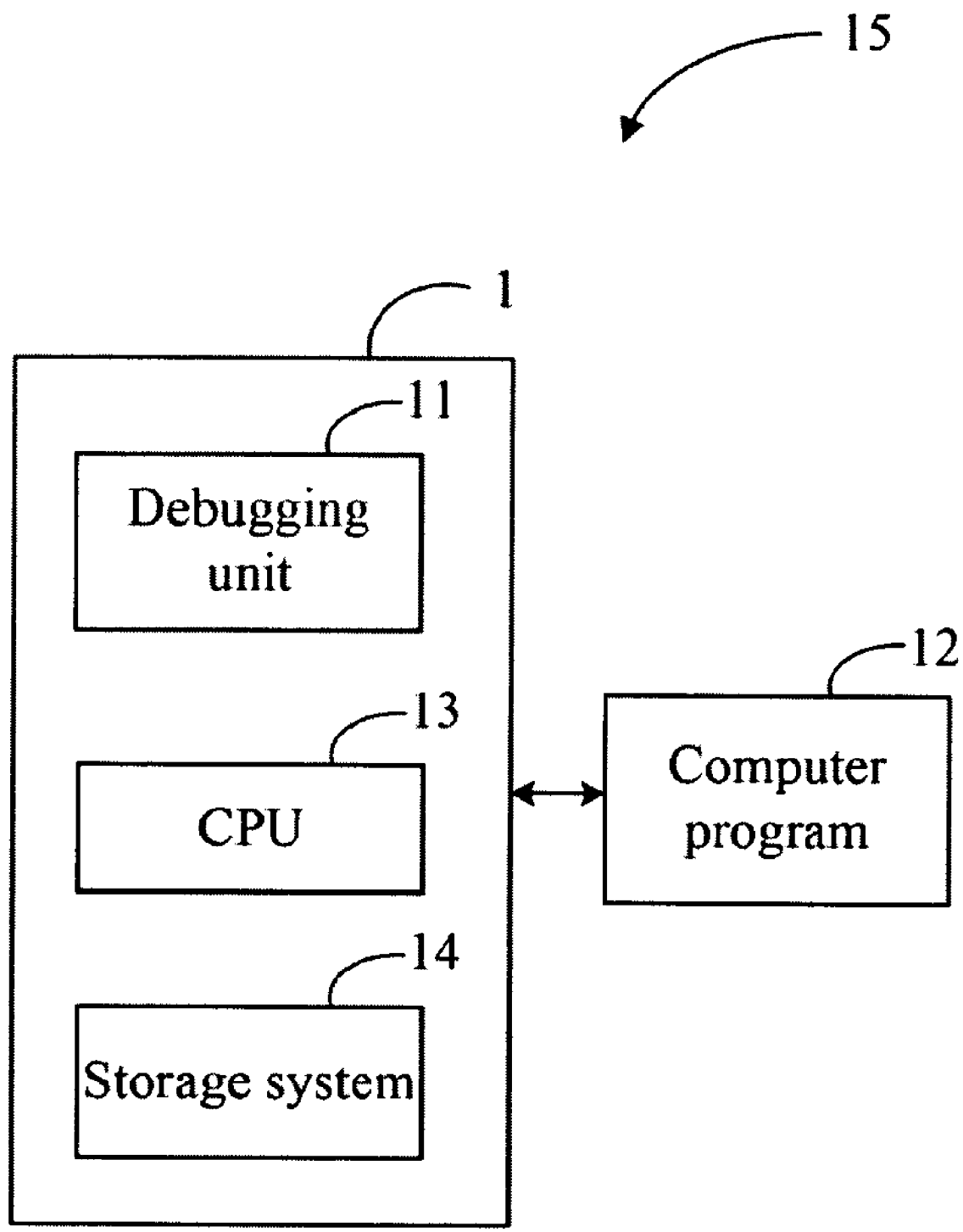
FIG. 1 is a block diagram of one embodiment of a system for debugging a computer program in SMM.

FIG. 1 is a block diagram of one embodiment of a system 1 for debugging a computer program 12 in SMM. In the embodiment, the system 1 includes a debugging unit 11, a central processing unit (CPU) 13, and a storage system 14. The CPU 13 executes the debugging unit 11 and the computer program 12. The CPU 13 may comprise a plurality of registers, such as a flag register (Flags), a code segment register (CS), an instruction pointer register (IP), and a counter register (CX). The above-described registers are not shown in FIG. 1. The storage system 14 stores instructions of the debugging unit 11 and the computer program 12, and stores data that are used, processed, and obtained while the computer program 12 is debugged. The system 1 and the computer program 12 may embedded in a computer system 15, such as a desktop computer system, and a notebook computer system.

The debugging unit 11 debugs the computer program 12 by using a software interrupt INT1. In the computer system 15, the CPU 13 may generate a software interrupt INT1 after an instruction of the computer program 12 is executed, while a trap flag of the flag register is set as "1." The debugging unit 11 records an instruction address of the computer program 12 when the software interrupt INT1 is generated.

In one embodiment, the debugging unit 11 records a jump-from address and a jump-to address for each jump caused by a jump instruction of the computer program 12, instead of recording each instruction address of the computer program 12. It may be understood that a jump or branch is a point in the computer program 12 where the control flow of the computer program is altered. Jump instructions may divide instructions of the computer program 12 into a series of basic blocks. Each of the basic blocks is a linear sequence of instructions such that all branches into the basic block go to the first instruction, and only the last instruction branches out of the basic block. The basic block may terminate with a jump instruction that can direct a first linear execution to a new target address from which a second linear execution continues. Specifically, a jump instruction may be located at a jump-from address, and the jump instruction may cause the execution of the computer program 12 branch to a jump-to address.

Figure 2:
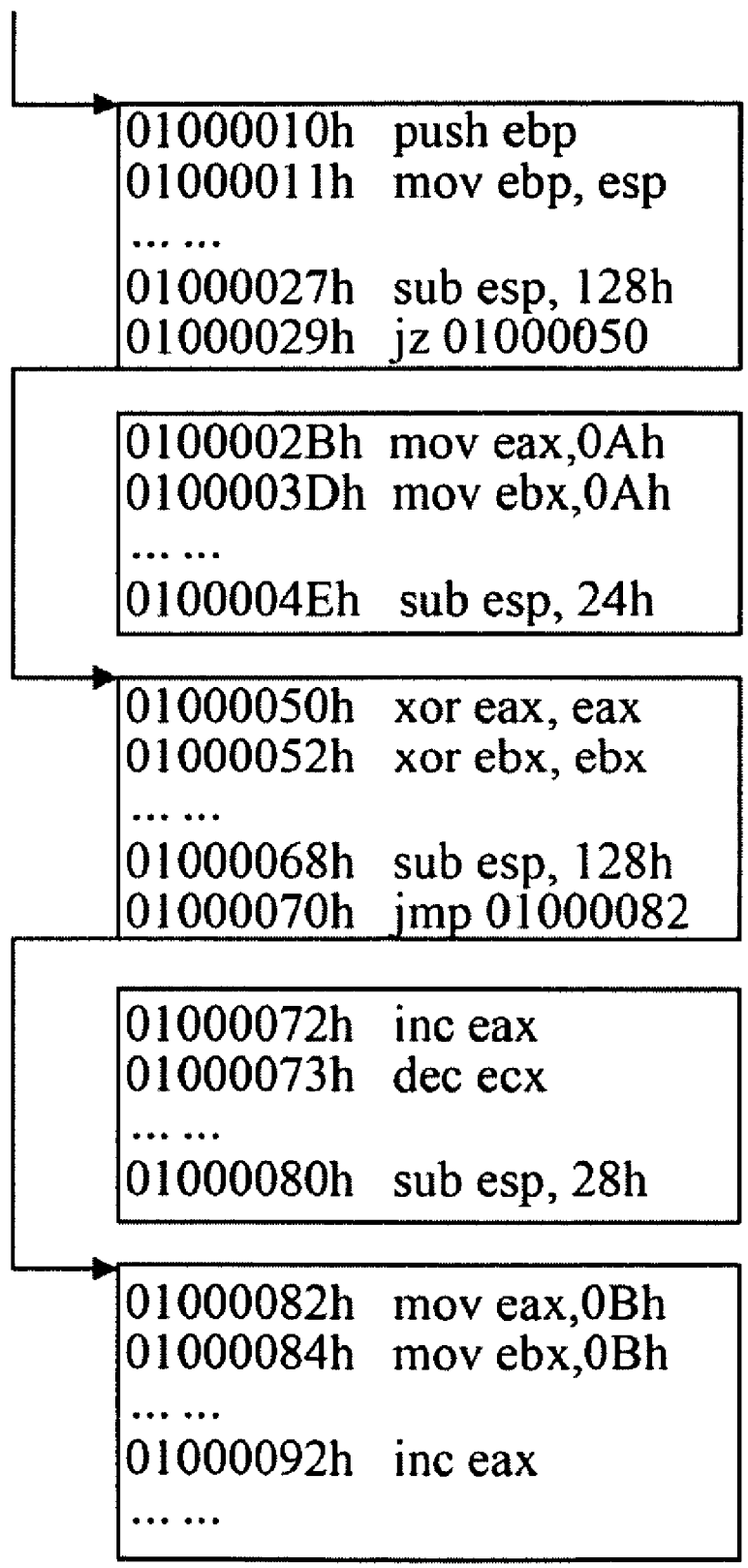
FIG. 2 illustrates one embodiment of a computer program divided into a series of basic blocks by jump instructions.

FIG. 2 illustrates one embodiment of the computer program 12 divided into a plurality of basic blocks by jump instructions. In the illustrated embodiment, the computer program 12 is executed from a memory address of "01000010h." A first jump takes place at a memory address of "01000029h," whose target address is "01000050h." A second jump takes place at a memory address of "01000070h," whose target address is "01000082h." The computer program 12 ends at a memory address of "01000092h." Accordingly, a first jump-from address is "01000029h," a first jump-to address is "01000050h," and a second jump-from address is "01000070h," a second jump-to address is "01000082h." In the embodiment, the first basic block is from "01000010h" to "01000029h," the second basic block is from "01000050h" to "01000070h," and the third basic block is from "01000082h" to "01000092h." It is noted that the values with a suffix "h" are values in hexadecimal.

There are two usual forms of jump instruction. One jump instruction is a conditional jump instruction indicating that a corresponding jump may either take place or not take place, depending on a condition such as a CPU flag. Another jump instruction is an unconditional jump instruction which always causes a jump to take place. In the illustrated embodiment described above, "jz" is a conditional jump instruction, and "jmp" is an unconditional jump instruction. The first basic block may be from "0100001h" to "01000070h" if a jump caused by the "jz" instruction does not take place.

Figure 3:
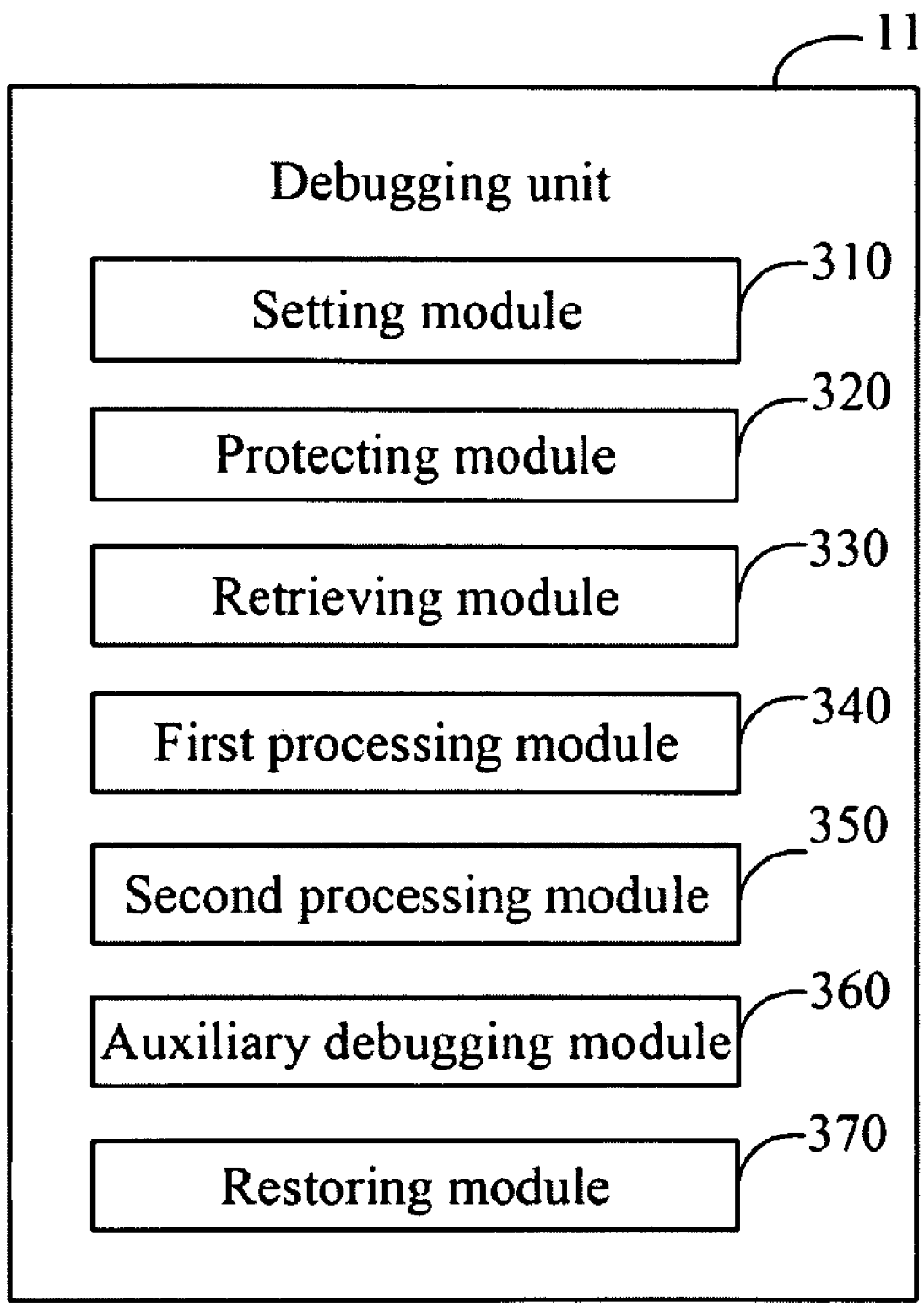
FIG. 3 is a block diagram of one embodiment of a debugging unit comprising function modules.

FIG. 3 is a block diagram of one embodiment of the debugging unit 11 comprising function modules. In one embodiment, the debugging unit 11 includes a setting module 310, a protecting module 320, a retrieving module 330, a first processing module 340, a second processing module 350, an auxiliary debugging module 360, and a restoring module 370. One or more specialized or general purpose processors, such as the CPU 13 may be used to execute the setting module 310, the protecting module 320, the retrieving module 330, the first processing module 340, the second processing module 350, the auxiliary debugging module 360, and the restoring module 370.

The setting module 310 is configured for setting a trap flag of the flag register so as to generate a software interrupt INT1 after executing an instruction of the computer program 12. In one embodiment, the trap flag is set as "1."

The protecting module 320 is configured for protecting a plurality of registers by pushing the registers into a stack when the software interrupt INT1 is generated. In one embodiment, the registers include the flag register, a code segment register, and an instruction pointer register. In another embodiment, some other registers, such as a counter register is pushes into the stack in order to enable a detection of program faults in the computer program 12.

The retrieving module 330 is configured for retrieving an operation code of a next instruction following the current instruction of the computer program 12 from the storage system 14 so as to determine the type of the next instruction. Each instruction corresponds to a certain operation code, for example, "C3" denotes a near return instruction, and "9A" denotes a far call instruction, wherein "C3" and "9A" are values in hexadecimal.

The first processing module 340 is configured for protecting the trap flag to prevent the trap flag from changing value when the next instruction is a POPF instruction. The POPF instruction is used to pop a top of the stack into the flag register, which may affect the value of the trap flag. For example, when the top of the stack is equal to "1000h," the trap flag is changed from "1" to "0" after executing the POPF instruction.

The second processing module 350 is configured for calculating a jump-from address and a jump-to address when the next instruction is a jump instruction and a jump caused by the next instruction takes place. The second processing module 350 is further configured for storing the jump-from address and the jump-to address into the storage system 14. In one embodiment, the jump-from address and the jump-to address are stored in a circular memory buffer of the storage system 14.

The auxiliary debugging module 360 is configured for detecting logic errors within the computer program 12 in addition to recording the jump-from and jump-to addressed of the computer program 12. In one embodiment, the auxiliary debugging module 360 checks if there is a logic error by examining the counter register. For example, after executing a LOOP instruction, the value of the counter register may change from "0" to "FFFFh," which is a logic error that causes the computer program 12 to operate incorrectly.

The restoring module 370 is configured for restoring the registers from the stack, and returning to the computer program 12.

Figure 4:
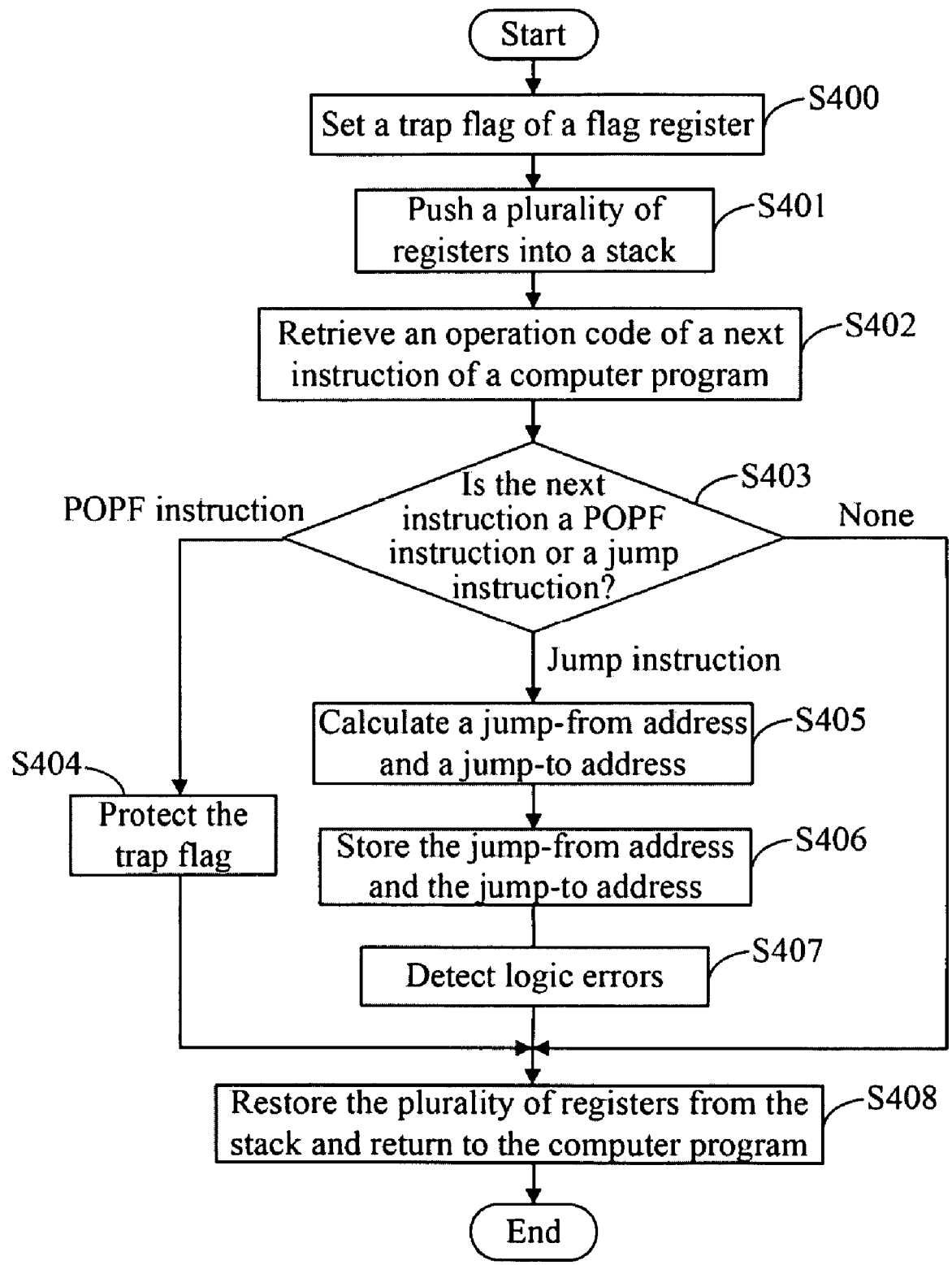
FIG. 4 is a flowchart of one embodiment of a method for debugging a computer program in SMM.

FIG. 4 is a flowchart of one embodiment of a method for debugging a computer program in SMM by implementing the system of FIG. 1. The method may be used to monitor execution of a computer program so as to detect program faults in the computer program. Depending on the embodiments, additional blocks may be added, others removed, and the ordering of the blocks may be changed.

In block S400, the setting module 310 sets a trap flag of a flag register so as to generate a software interrupt INT1 after executing an instruction of the computer program 12. In one embodiment, the setting module 310 pushes the flag register into a stack, and performs a bitwise OR operation between the top of the stack and a value "0100h," and then pops the top of the stack into the flag register, so that the trap flag is set as "1."

Figure 5:
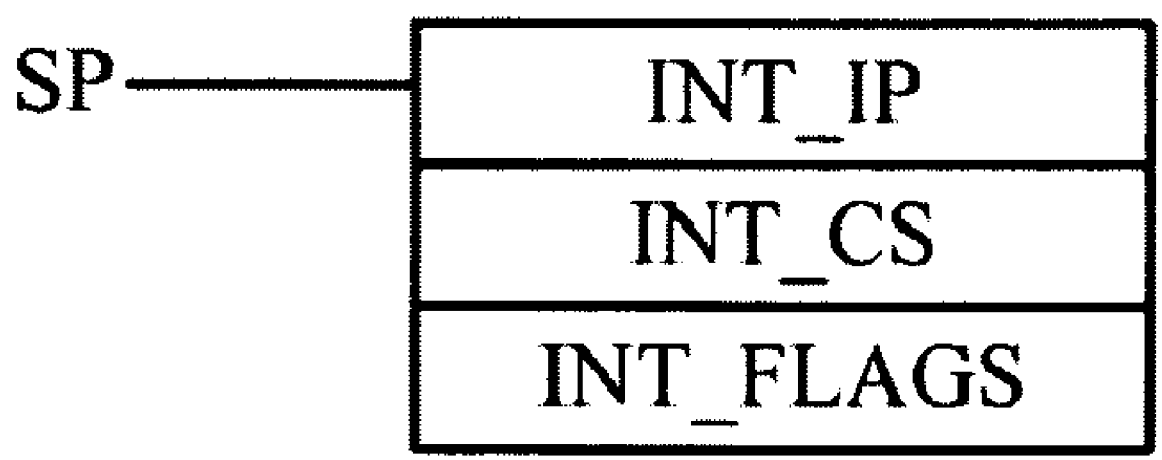
FIG. 5 illustrates one embodiment of a flag register and a return address of an interrupt stored in a stack.

In block S401, the protecting module 320 pushes registers into the stack when the software interrupt INT1 is generated. In one embodiment with reference to FIG. 5, the flag register shown as INT_FLAGS, a code segment register shown as INT_CS, and an instruction pointer register shown as INT_IP are pushed into the stack. It may be understood that a return address of an interrupt, such as the software interrupt INT1 may be determined by INT_CS (called a segment address) and INT_IP (called an effective address).

Figure 6:
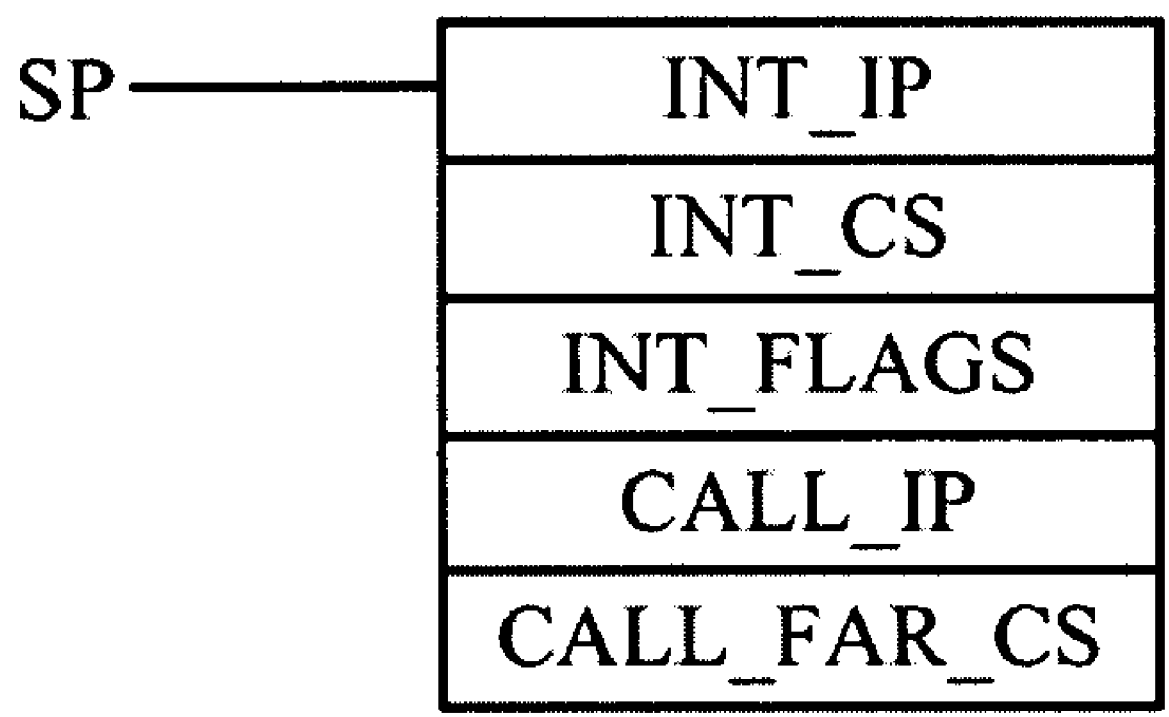
FIG. 6 illustrates one embodiment of a return address of a far call, the flag register, and a return address of an interrupt stored in the stack.

In another embodiment with reference to FIG. 6, a return address of a far call, the flag register, and a return address of an interrupt are stored in the stack. The return address of a far call may include a segment address shown as CALL_Far_CS, and an effective address shown as CALL_IP. For a near call, a return address may include an effective address denoted as CALL_IP.

Figure 7:
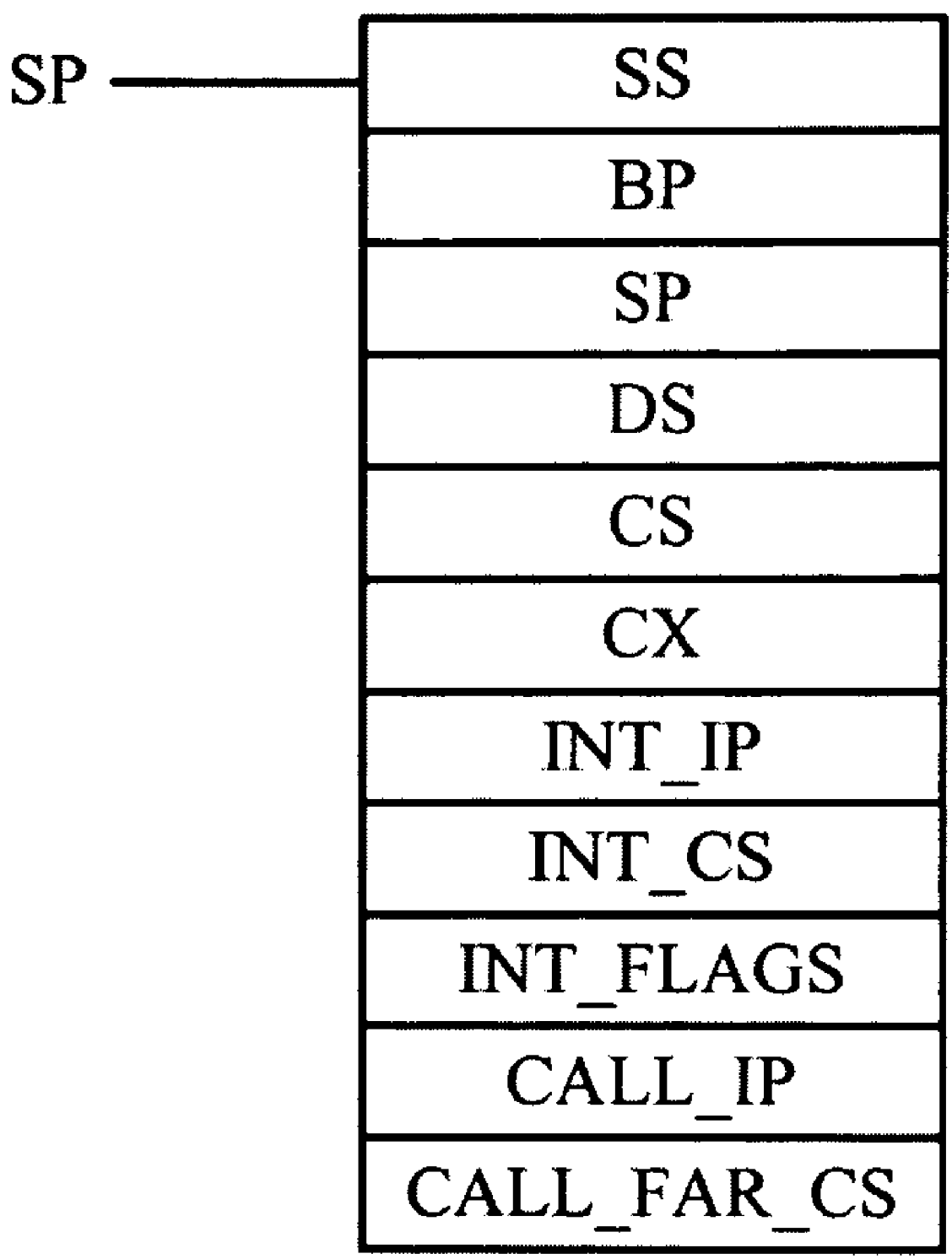
FIG. 7 illustrates one embodiment of a return address of a far call, the flag register, a return address of an interrupt, a counter register, a data segment register, a stack pointer register, a base pointer register, and a stack segment register stored in the stack.

In another embodiment with reference to FIG. 7, some other registers, as well as a return address of a far call, the flag register, and a return address of an interrupt are stored in the stack. In this embodiment, the other registers include a counter register (CX), a data segment register (DS), a stack pointer register (SP), a base pointer register (BP) and a stack segment register (SS).

In block S402, the retrieving module 330 retrieves an operation code of a next instruction following the current instruction of the computer program 12 from the storage system 14. In one embodiment, the retrieving module 330 obtains the operation code by determining a memory address where stores the operation code of the next instruction. For example, a segment address of the next instruction is transmitted to the data segment register (DS), an effective address of the next instruction is transmitted to an index register, such as a source-index register (SI). Therefore, the operation code of the next instruction can be retrieved according to the memory address determined by DS and SI.

In block S403, the retrieving module 330 determine if the next instruction is a POPF instruction, or a jump instruction according to the retrieved operation code. If the next instruction is neither a POPF instruction nor a jump instruction, the flow may move to block S408. In one embodiment, a POPF instruction has an operation code of "9D," a jump instruction has an operation code shown in FIG. 8 and FIG. 9, for example, "75," "E9," or "C3," wherein "9D," "75," "E9," and "C3" are all values in hexadecimal.

If the next instruction is a POPF instruction, in block S404, the first processing module 340 protects the trap flag so as to prevent the trap flag from changing value after executing the POPF instruction. The POPF instruction may pop the top of the stack into the flag register. In one embodiment, the first processing module 340 performs a bitwise OR operation between the top of the stack and a value "0100h," so that the trap flag keeps equal to "1" after executing the POPF instruction. As such, the debugging unit 11 can continue to debug the computer program using software interrupt INT1.

If the next instruction is a jump instruction and a jump caused by the next instruction takes place, in block S405, the second processing module 350 calculates a jump-from address and a jump-to address. If a jump does not take place, the flow may move to block S408.

In one embodiment, the jump instruction may be selected from the group consisting of a short conditional jump instruction, a short unconditional jump instruction, a near conditional jump instruction, a near unconditional jump instruction, a far unconditional jump instruction, a near call instruction, a far call instruction, a near return instruction, and a far return instruction. Correspondingly, the jump-from address and the jump-to address for each jump instruction may be calculated, as described below. The jump-to addresses and jump-from addresses for various short conditional jump instructions and near conditional jump instructions are shown in FIG. 8. The jump-to addresses and jump-from addresses for a short unconditional jump instruction, near unconditional jump instruction, far unconditional jump instruction, near call instruction, far call instruction, near return instruction, and far return instruction are shown in FIG. 9.

If the next instruction is a short conditional jump instruction and a corresponding jump condition is met, the jump-from address is INT_CS*10h+INT_IP, and the jump-to address is INT_CS*10h+(INT_IP+(rel8+2)&FFh), wherein the "rel8" is an 8-bit address offset between a next instruction of the short conditional jump instruction and the jump-to address, and the "&" is a bitwise AND operator.

If the next instruction is a short unconditional jump instruction, the jump-from address is INT_CS*10h+INT_IP, and the jump-to address is INT_CS*10h+(INT_IP+(rel8+2)&FFh), wherein the "rel8" is an 8-bit address offset between a next instruction of the short unconditional jump instruction and the jump-to address.

If the next instruction is a near conditional jump instruction and a corresponding jump condition of the near conditional jump instruction are met, the jump-from address is INT_CS*10h+INT_IP, and the jump-to address is INT_CS*10h+(INT_IP+(rel16+4)&FFFFh), wherein the "rel16" is an 16-bit address offset between a next instruction of the near conditional jump instruction and the jump-to address.

If the next instruction is a near unconditional jump instruction and a corresponding jump condition is met, the jump-from address is INT_CS*10h+INT_IP, and the jump-to address is INT_CS*10h+(INT_IP+(rel16+3)&FFFFh), wherein the "rel16" is an 16-bit address offset between a next instruction of the near unconditional jump instruction and the jump-to address.

If the next instruction is a far unconditional jump instruction, the jump-from address is INT_CS*10h+INT_IP, and the jump-to address is seg16*10h+(INT_IP+(rel16+5)&FFFFh, wherein the "seg16" is a segment address of a next instruction of the far unconditional jump instruction, and the "rel16" is an effective address of a next instruction of the far unconditional jump instruction.

If the next instruction is a near call instruction, the jump-from address is INT_CS*10h+INT_IP, and the jump-to address is INT_CS*10h+(INT_IP+(rel16+3)&FFFFh), wherein the "rel16" is an 16-bit address offset between a next instruction of the near call instruction and the jump-to address.

If the next instruction is a far call instruction, the jump-from address of a far call is INT_CS*10h+INT_IP, and the jump-to address is seg16*10h+(INT_IP+(rel16+5)&FFFFh), wherein the "seg16" is a segment address of a next instruction of the far call instruction, and the "rel16" is an effective address of a next instruction of the far call instruction.

If the next instruction is a near return instruction, the jump-from address is INT_CS*10h+INT_IP, and the jump-to address is INT_CS*10h+CALL_IP, wherein the "CALL_IP" is an effective address of a corresponding near call.

If the next instruction is a far return instruction, the jump-from address is INT_CS*10h+INT_IP, and the jump-to address is CALL_Far_CS*10h+CALL_IP, wherein the "CALL_Far_CS" is a segment address of a corresponding far call, and the "CALL_IP" is an effective address of the corresponding far call.

In block S406, the second processing module 350 stores the jump-from address and the jump-to address into the storage system 14. In one embodiment, the storage system 14 may be a memory or a hard disk drive. In one example, the jump-from address and the jump-to address are stored in a circular memory buffer, which uses an index to record a memory address in the circular memory buffer to store a next jump-from address and jump-to address.

In block S407, the auxiliary debugging module 360 detects logic errors within the computer program 12 in addition to recording the jump-from and jump-to addressed of the computer program 12. In one embodiment, the auxiliary debugging module 360 checks if there is a logic error by examining the counter register. For example, after executing a LOOP instruction, the value of the counter register may change from "0" to "FFFFh," which is a logic error that causes the computer program 12 to operate incorrectly.

In block S408, the restoring module 370 restores the registers from the stack, and returns to the computer program 12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for debugging a computer program executed by a processor, the system comprising a debugging unit and a storage system, the debugging unit comprising:

a setting module configured for setting a trap flag of a flag register of the processor, so as to generate a software interrupt after an instruction of the computer program is executed by the processor, wherein the instruction is stored in the storage system;

a protecting module configured for pushing values of a plurality of registers of the processor into a stack to protect the plurality of registers when the software interrupt is generated, wherein the values of the plurality of registers comprise a return address of the software interrupt, and the return address comprises a segment address INT_CS and an effective address INT_IP;

a retrieving module configured for retrieving an operation code of a next instruction following a current instruction of the computer program from the storage system, wherein the operation code determines a type of the next instruction;

a first processing module configured for performing a bitwise OR operation between the top of the stack and a value "0100h" upon condition that the next instruction is a pop flags (POPF) instruction;

a second processing module configured for calculating a jump-from address and a jump-to address upon condition that the next instruction is a jump instruction and causes a jump to take place, and storing the jump-from address and the jump-to address into the storage system, wherein the jump-from address is INT_CS*10h+INT_IP and the jump-to address is INT_CS*10h+(INT_IP+(rel8+2) &FFh) upon condition that the next instruction is a short conditional jump instruction and a corresponding jump condition is met, wherein the "rel8" is an 8-bit address offset between a next instruction of the short conditional jump instruction and the jump-to address; and a restoring module configured for restoring the values of the plurality of registers from the stack, and returning to the computer program.

2. The system of claim 1, wherein the plurality of registers comprise the flag register, a counter register, a code segment register, and an instruction pointer register.

3. The system of claim 1, further comprising an auxiliary debugging module configured for detecting logic errors within the computer program according to the values of the plurality of registers.

4. The system of claim 1, wherein the jump-from address and the jump-to address are stored in a circular memory buffer.

5. A computer-implemented method for debugging a computer program executed by a processor, the method comprising:
   setting a trap flag of a flag register of the processor so as to generate a software interrupt after an instruction of the computer program is executed by the processor, wherein the instruction of the computer program is stored in a storage system;
   pushing values of a plurality of registers of the processor into a stack to protect the plurality of registers when the software interrupt is generated, wherein the values of the plurality of registers comprise a return address of the software interrupt, and the return address comprises a segment address INT_CS and an effective address INT_IP;
   retrieving an operation code of a next instruction following a current instruction of the computer program from a storage system, wherein the operation code determines a type of the next instruction;
   performing a bitwise OR operation between the top of the stack and a value "0100h" upon condition that the next instruction is a pop flags (POPF) instruction;
   calculating a jump-from address and a jump-to address upon condition that the next instruction is a jump instruction and cause a jump to take place, and storing the jump-from address and the jump-to address into the storage system, wherein the jump-from address is INT_CS*10h+INT_IP and the jump-to address is INT_CS*10h+(INT_IP+(rel8+2) &FFh) upon condition that the next instruction is a short conditional jump instruction and a corresponding jump condition is met, wherein the "rel8" is an 8-bit address offset between a next instruction of the short conditional jump instruction and the jump-to address; and
   restoring the values of the plurality of registers from the stack, and returning to the computer program.

6. The method of claim 5, wherein the plurality of registers comprise the flag register, a counter register, a code segment register, and an instruction pointer register.

7. The method of claim 6, further comprising detecting logic errors within the computer program according to the values of the plurality of registers.

8. The method of claim 5, wherein the jump-from address is INT_CS*10h+INT_IP and the jump-to address is INT_CS*10h+(INT_IP+(rel8+2) &FFh) upon condition that the next instruction is a short unconditional jump instruction, wherein the "rel8" is an 8-bit address offset between a next instruction of the short unconditional jump instruction and the jump-to address.

9. The method of claim 5, wherein the jump-from address is INT_CS*10h+INT_IP and the jump-to address is INT_CS*10h+(INT_IP+(rel16+4) &FFFFh) upon condition that the next instruction is a near conditional jump instruction and a corresponding jump condition is met, wherein the "rel16 is an 16-bit address offset between a next instruction of the near conditional jump instruction and the jump-to address.

10. The method of claim 5, wherein the jump-from address is INT_CS*10h+INT_IP and the jump-to address is INT_CS*10h+(INT_IP+(rel16+3) &FFFFh) upon upon condition that the next instruction is a near unconditional jump instruction, wherein the "rel16" is an 16-bit address offset between a next instruction of the near unconditional jump instruction and the jump-to address.

11. The method of claim 5, wherein the jump-from address is INT_CS*10h+INT_IP and the jump-to address is seg16*10h+(INT_IP+(rel16+5) &FFFFh) upon upon condition that the next instruction is a far unconditional jump instruction, wherein the "seg16" is a segment address of a next instruction of the far unconditional jump instruction, and the "rel16" is an effective address of a next instruction of the far unconditional jump instruction.

12. The method of claim 5, wherein the jump-from address is INT_CS*10h+INT_IP and the jump-to address is INT_CS*10h+(INT_IP+(rel16+3) &FFFFh) upon upon condition that the next instruction is a near call instruction, wherein the "rel16" is an 16-bit address offset between a next instruction of the near call instruction and the jump-to address.

13. The method of claim 5, wherein the jump-from address of a far call is INT_CS*10h+INT_IP and the jump-to address is seg16*10h+(INT_IP+(rel16+5) &FFFFh) upon condition that the next instruction is a far call instruction, wherein the "seg16" is a segment address of a next instruction of the far call instruction, and the "rel16" is an effective address of a next instruction of the far call instruction.

14. The method of claim 5, wherein the jump-from address is INT_CS*10h+INT_IP and the jump-to address is INT_CS*10h+CALL_IP upon condition that the next instruction is a near return instruction, wherein the "CALL_IP" is an effective address of a corresponding near call.

15. The method of claim 5, wherein the jump-from address is INT_CS*10h+INT_IP and the jump-to address is CALL_FAR_CS*10h+CALL_IP upon condition that the next instruction is a far return instruction, wherein the "CALL_Far_CS" is a segment address of a corresponding far call, and the "CALL_IP" is an effective address of a corresponding far call.

16. A non-transitory computer-readable medium having stored thereon instructions that, when executed by a processor, cause the computerized device to execute a computer-implemented method for debugging a computer program, the method comprising:
   setting a trap flag of a flag register of the processor so as to generate a software interrupt after an instruction of the computer program is executed, wherein the instruction of the computer program is stored in a storage system;
   pushing values of a plurality of registers of the processor into a stack to protect the plurality of registers when the software interrupt is generated, wherein the values of the plurality of registers comprise a return address of the software interrupt, and the return address comprises a segment address INT_CS and an effective address INT_IP;
   retrieving an operation code of a next instruction following a current instruction of the computer program from a storage system, wherein the operation code determines a type of the next instruction;
   performing a bitwise OR operation between the top of the stack and a value "0100h" upon condition that the next instruction is a pop flags (POPF) instruction;
   calculating a jump-from address and a jump-to address upon condition that the next instruction is a jump instruction and cause a jump to take place, and storing the jump-from address and the jump-to address into the storage system, wherein the jump-from address is INT_CS*10h+INT_IP and the jump-to address is INT_CS*10h+(INT_IP+(rel8+2) &FFh) upon condition that the next instruction is a short conditional jump instruction and a corresponding jump condition is met, wherein the "rel8" is an 8-bit address offset between a next instruction of the short conditional jump instruction and the jump-to address; and restoring the values of the plurality of registers from the stack and returning to the computer program.

17. The medium of claim 16, wherein the plurality of registers comprises the flag register, a counter register, a code segment register, and an instruction pointer register.

* * * * *